J. C. CHAPMAN.
TIRE.
APPLICATION FILED OCT. 10, 1916.
1,316,686.
Patented Sept. 23, 1919.
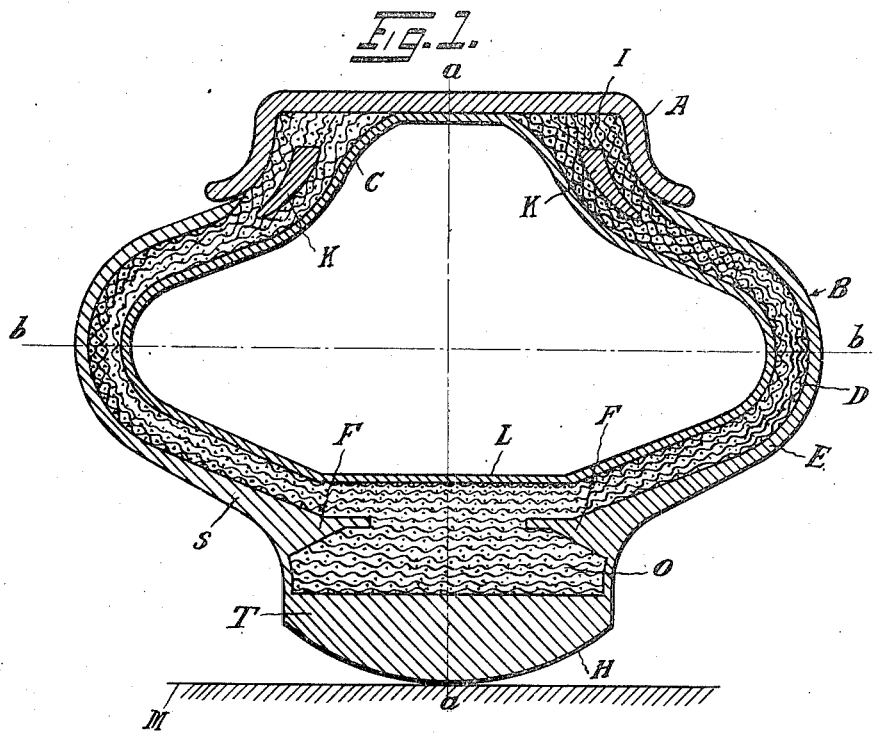
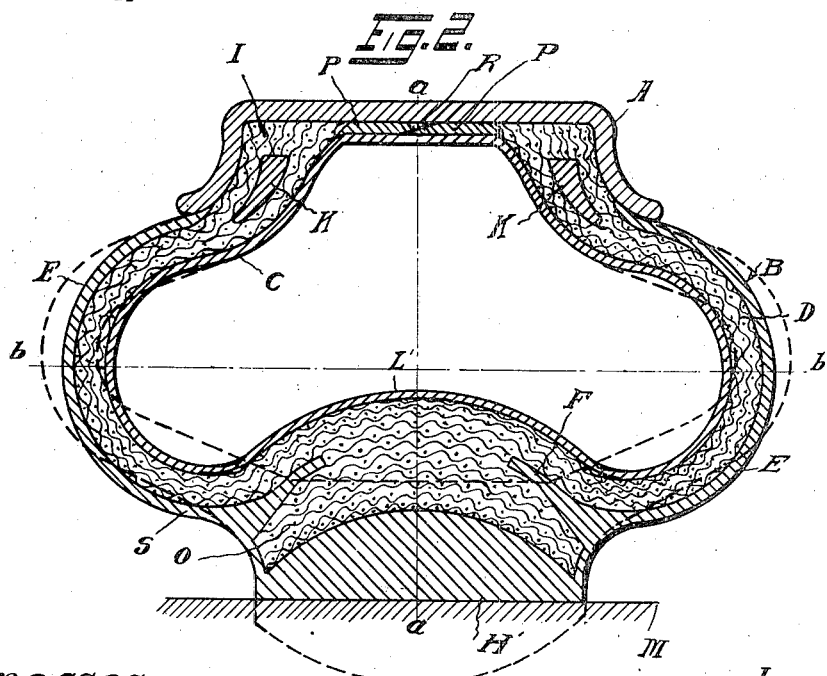
Witnesses:
Inventor:
John C. Chapman.
By his Atty,

UNITED STATES PATENT OFFICE.

JOHN C. CHAPMAN, OF NEW YORK, N. Y.

TIRE.

1,316,686. Specification of Letters Patent. Patented Sept. 23, 1919.

Application filed October 10, 1916. Serial No. 124,778.

*To all whom it may concern:*

Be it known that I, JOHN C. CHAPMAN, a citizen of the United States, residing in New York, in the county of New York and State of New York, have invented certain new and useful Improvements in Tires, of which the following is a specification.

The main objects of my invention are to provide a vehicle tire or shoe of the pneumatic type used on automobiles, which is especially designed for use on those adapted for carrying loads of considerable weight, such as large touring-cars, mercantile trucks, etc., which tire will be practically non-puncturable, of long life, and which will be but little if any deformed at the sides at a right angle to the tread when under great road pressure, and that inwardly, thereby preventing the formation of what are commonly called "side cracks" therein.

Another object is to so shape such tire in the vulcanizing mold, and to shape, dispose and arrange the various layers of strengthening fabric and rubber or other vulcanizable material used, in such manner that the deformation of the tire when under load pressure will not so quickly deteriorate the same as in former like structures; and this with the use of a minimum amount of rubber, or like costly highly elastic material.

Tires of my improved form herein shown, while not limited thereto, are particularly designed and adapted for use as what are known as "low-tension" tires; wherein the initial air-pressure within the same, and when not under heavy load, or undergoing road-shocks, is comparatively low, say from 12 to 30 pounds per square inch; high pressure tires being those in which the initial pressure is anything over 30 pounds, some times much over 100.

One advantage of my said improved tire is that under heavy load or road shocks, the area of the tread-surface in contact with the road-bed is greatly increased over the normal; whereby the wear upon the tread is considerably decreased; and in addition, the life of the tire is increased by reason of the fabric of which it is partly built up.

Another advantage of such tire is that by reason of the main portion of the tread being composed of highly resilient rubber unmixed with fabric or other less elastic material, the wear upon the tread is minimized and the effect of road-shocks reduced.

Another advantage is that by reason of the peculiar construction, shape, and proportions of pure rubber and fabric and rubber portions vulcanized together, the strain upon the side-walls under heavy load pressure, or severe road-shocks is never a thrust in line with the fabric-plies, but always a pull, whereby kinking of such side-walls, and the consequent formation of side-cracks therein is absolutely prevented.

These and other features, capabilities and advantages of the invention will appear from the following specification, of which the accompanying drawing forms a part, wherein similar letters of reference designate like or equivalent parts wherever found throughout the several views and in which:

Figure 1 is an end view of my improved form of tire, taken in vertical cross-section of one side in position upon the wheel-rim, and under pneumatic pressure; and Fig. 2, is a like view of the same when upon the roadway and under great load pressure, or excessive road-shock.

Referring to the drawing:—

The reference letter A designates the tire-securing annular vehicle wheel-rim or felly of any suitable shape, in and against which the tire-shoe or outer covering B, is held in place in the rim channel by its own resiliency, and the pressure of the air usually in the elastic-rubber inner air-tube or casing C. The inner portion of the shoe or tire shown in dotted lines indicates suitable strips of strong flexible fabric D, alternated when placed in the vulcanizing mold in process of manufacture with rubber strips; while the outer exterior wall strip E, is provided with inwardly extending annular securing rings F, of substantially the shape shown, and the tread T having the convex-arcuate outer road-face or tread-surface H, are all preferably of rubber without any mixture of strengthening fabric; and at the securing-rim base, and embedded in the fabric and rubber mass are usually and preferably, the two annular compressible soft-rubber base-rings K, usually and preferably of the slightly arcuate-triangular-form indicated. All of which rubber, and fabric portions during manufacture are vulcanized into one integral homogeneous structure, which when taken from the mold will be of the substantially elongated irregularly elliptical shape shown, and when not under heavy load-pressure or road-shock having the inner-wall-face L of the tread portion forming a substantially straight line plane face annular ring (Fig. 1); which surface, when under such heavy load pressure, or road-shocks will be forced inward and upward into a convex-shape as indicated at L' of Fig. 2; this being brought about by the flattening into a straight line H' (Fig. 2) upon the road-bed M, of the normally convexed outer tread-surface H.

In other words under great load pressure or road-shock the inner normal straight surface, and the outer convex surface of the tread will change places; and thus the interior area of the compressed air-space or chamber being lessened, and its cubic capacity consequently considerably reduced, the pneumatic pressure within the tire will be increased, and this increased pressure will decrease the diameter of the tire horizontally along the line b—b, by the forcing of the side walls at the line b—b into arcuate curves of greater radii than in Fig. 1; or as shown in the dotted lines of Fig. 2, when not under load or road-shock, by reason of the fact that the tread is of the form shown in cross-section, with the sides at b—b comparatively thinner than the tread; and the road-surface M, maintaining the tread H' horizontal and in a straight line causing the consequent interior convexity L', this will inevitably bring about this inward deformation of the side-walls and consequent decrease in the horizontal, diameters of the tire, with every increase of pressure due to increase of vehicle load, or road-shock.

The curvature of the sides of my tire is substantially on the arc of a circle when the tire is in normal position, that is, when not under load pressure, Fig. 1; but when the tire is under load pressure the sides form bends as shown in Fig. 2. The tread-piece of my tire which is constructed as above stated moves inwardly and upwardly at the point of contact thereof with the road surface when the tire is under load pressure to force inwardly and upwardly the bottom of the interior air space of the tire, the intention being to coöperate with the sides, to shorten the vertical diameter a—a Figs. 1 and 2, when the tire is under load pressure, and thereby to provide greater area of air pressure for the tire in the line of the load.

Although I have in Fig. 1, shown the tire shoe as peripherally open at the base-portion abutting against the annular traction-wheel tire retaining felly or rim, in some cases and with certain forms of tires, the same may be closed thereat by a central-web P, (Fig. 2) formed usually of highly elastic pure-rubber, vulcanized into an integral portion of the outer tire or shoe and provided at one point with a slit longitudinal lapped R, of sufficient length to permit of the entrance and withdrawal of the inner air-tube C; and the passage out through the felly of the usual air-valve (not shown), or in other cases such web P, may be unslitted, and the inner-air tube C be entirely omitted, and the compressed-air admitted directly to the thus hermetically closed and air-tight shoe, by way of the air-valve.

In the drawing, which is of full size and rightly proportioned in all its various parts, I have shown a vehicle tire of what is commonly known as a four inch (4") size; that is a tire of my improved form adapted to take the place of and be fitted in position upon a wheel-rim, or felly adapted to receive a tubular tire-shoe, of any of the ordinary well known forms known to the trade as "34 x 4" tires, and when of such size, the convexed outer tread or road surface H, is normally and when not under heavy load pressure substantially the segment of a circle having a radius of two inches.

One of the main features of my invention lies in the fact, that as shown the inner wall portion D, is formed in such manner and of such material (in this case fabric strips and rubber vulcanized together) as to be less elastic and yielding than the outer covering surface or wall of softer and more resilient or elastic material, which is of elastic-rubber; and having the rings F, of substantially the shape shown; while the tread portion of the inner lesser elastic fabric portion D, is in the form of an annular peripheral male dovetail-ring O, vulcanized into a like shaped annular female dove-tail cavity formed in the softer elastic inclosing rubber of the tread portion.

It is evident that many changes and modifications, other than what is referred to herein, may be made in the construction of my said improved form of tire, without departing from the spirit of my invention, or exceeding the scope of the claims.

I claim:

1. A pneumatic tire comprising side-walls formed integral with a tread-portion of greater thickness than the side-walls, the inner wall portion of the entire tire being of less elasticity than the outer portion, and such inner portion being connected with the outer elastic tread portion by a dovetail annular-joint.

2. A pneumatic tire comprising side-walls formed integral with a tread-portion of greater thickness than the side-walls, the inner wall portion of the entire tire being of less elasticity than the outer portion, and such inner portion being connected with the outer elastic tread portion by a dovetail annular-joint; the male member being on the inner and the female in the outer wall portion.

3. A pneumatic tire comprising side-walls formed integral with a tread-portion of greater thickness than the side-walls, the inner wall portion of the entire tire being of less elasticity than the outer portion, and such inner portion being connected with the outer elastic tread portion by a dovetail annular-joint; the tread-portion being provided with a normally unconvexed inner surface, and a normally convexed or segmentally arcuate outer road contacting surface; which surfaces are adapted to reverse their contours upon increase of load pressure upon the tire.

4. A pneumatic tire comprising side-walls formed integral with a tread-portion of greater thickness than the side-walls, the inner wall portion of the entire tire being of less elasticity than the outer portion, and such inner portion being connected with the outer elastic tread-portion by a dovetail annular-joint; the male member being on the inner and the female in the outer wall portion, the tread-portion being provided with a normally unconvexed inner surface, and a normally convexed or segmentally arcuate outer road contacting surface; which surfaces are adapted to reverse their contours upon increase of load pressure upon the tire.

5. A pneumatic tire comprising side-walls formed integral with a tread-portion of greater thickness than the side-walls, and outwardly and annularly convexed, the inner wall portion of the tire being composed of a combination of fabric and rubber; and the outer covering wall-portion being composed solely of material of higher elasticity than the inner, and such portion being connected with the outer elastic tread-portion by a dovetail annular-joint.

6. A pneumatic tire comprising side-walls formed integral with a tread-portion of greater thickness than the side-walls, the inner wall portion of the tire being composed of a combination of fabric and rubber; the outer covering wall-portion being composed solely of material of higher elasticity than the inner, and such inner portion being connected with the outer elastic tread-portion by a dovetail annular-joint, the male member being on the inner and the female in the outer wall portion.

7. A pneumatic tire, comprising side-walls formed integral with and having projecting therefrom a tread-portion of greater thickness than the side-walls, provided with a normally convex or arcuate outer road-surface or tread; and an inner, normally straight lined unconvexed surface, which surfaces are adapted to reverse their contours upon increase of load pressure upon the tire; the air-chamber of the tire when inflated and not under load-pressure, having its horizontal diameter of much greater length than the vertical, and having the side-walls of substantially circular contour; such tire being provided with an inner wall-portion of less elasticity than the outer portion, the tread portion guarding the side walls against road contact.

8. A pneumatic tire, comprising side-walls formed integral with a tread-portion of greater thickness than the side-walls, provided with a normally convex or arcuate outer road-surface or tread; and an inner, normally straight lined unconvexed surface, which surfaces are adapted to reverse their contours upon increase of load-pressure upon the tire; the air-chamber of the tire when inflated and not under load-pressure, having its horizontal diameter of much greater length than the vertical, and having the side-walls of substantially circular contour; such tire being provided with an inner wall-portion of less elasticity than the outer portion; and having such inner portion connected with the outer elastic tread portion by an annular dovetail-joint.

JOHN C. CHAPMAN.

Witnesses:
 H. D. PENNEY,
 C. LADEL-DAVIS.